(12) United States Patent
Hidaka

(10) Patent No.: US 9,832,848 B2
(45) Date of Patent: Nov. 28, 2017

(54) LIGHTING SYSTEM AND METHOD FOR CONTROLLING LIGHTING SYSTEM

(71) Applicant: Panasonic Intellectual Property Management Co., Ltd., Osaka (JP)

(72) Inventor: Yuto Hidaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/011,026

(22) Filed: Jan. 29, 2016

(65) Prior Publication Data

US 2016/0234913 A1     Aug. 11, 2016

(30) Foreign Application Priority Data

Feb. 10, 2015   (JP) ................. 2015-024593

(51) Int. Cl.
*H05B 37/02* (2006.01)

(52) U.S. Cl.
CPC ..... *H05B 37/0281* (2013.01); *H05B 37/0227* (2013.01); *H05B 37/0245* (2013.01); *Y02B 20/42* (2013.01); *Y02B 20/44* (2013.01)

(58) Field of Classification Search
CPC ........ H05B 37/02; H05B 41/24; H05B 41/16; H05B 41/36; Y02B 20/40; G05B 12/02; G06K 7/01; G08B 5/22; H04B 7/00; H04L 12/26; H04L 12/28; G06F 19/00; G06F 11/30; F21V 9/00
USPC .......................... 315/292, 154; 370/442, 537
See application file for complete search history.

(56) References Cited

U.S. PATENT DOCUMENTS

| | | | | |
|---|---|---|---|---|
| 9,155,165 | B2* | 10/2015 | Chobot | H05B 37/029 |
| 2002/0154652 | A1* | 10/2002 | Yoshimura | H05B 37/0263 |
| | | | | 370/442 |
| 2008/0265799 | A1* | 10/2008 | Sibert | H05B 37/0245 |
| | | | | 315/292 |

(Continued)

FOREIGN PATENT DOCUMENTS

| | | |
|---|---|---|
| JP | 11-74089 A | 3/1999 |
| JP | 2002-299070 A | 10/2002 |

(Continued)

*Primary Examiner* — Douglas W Owens
*Assistant Examiner* — Wei Chan
(74) *Attorney, Agent, or Firm* — McDermott Will & Emery LLP

(57) ABSTRACT

A lighting system includes: a lighting device; a lighting controller; and a system controller. The system controller includes: a timer; a schedule storage for storing schedule information; a first communication circuit; and an instruction controller which causes a first communication circuit to transmit control information which includes an instruction associated with time indicated by a counter value. The lighting controller includes: a sensor which detects a person in a space where the lighting device is disposed, and brightness of the space; a second communication circuit; and a dimming controller which switches to one of modes that is indicated in the control information from another of the modes and executes the one of the modes, where the modes include (a) a human detection mode, (b) a brightness detection mode, and (c) a dimming level fixed mode.

9 Claims, 11 Drawing Sheets

(56) References Cited

U.S. PATENT DOCUMENTS

| | | | |
|---|---|---|---|
| 2009/0183405 A1* | 7/2009 | Wilkes | G06Q 30/0202 40/543 |
| 2013/0253713 A1* | 9/2013 | VanWagoner | A01G 25/16 700/284 |
| 2013/0342112 A1* | 12/2013 | Hidaka | H05B 37/0209 315/152 |
| 2014/0167621 A1* | 6/2014 | Trott | H05B 37/0218 315/154 |
| 2015/0108901 A1* | 4/2015 | Greene | H05B 37/0218 315/149 |

FOREIGN PATENT DOCUMENTS

| | | |
|---|---|---|
| JP | 2004-349065 A | 12/2004 |
| JP | 2010-123532 A | 6/2010 |
| JP | 2013-149463 A | 8/2013 |

\* cited by examiner

LIGHTING SYSTEM AND METHOD FOR CONTROLLING LIGHTING SYSTEM

CROSS REFERENCE TO RELATED APPLICATION

This application claims the benefit of priority of Japanese Patent Application Number 2015-024593 filed on Feb. 10, 2015, the entire content of which is hereby incorporated by reference.

BACKGROUND

1. Technical Field

The present disclosure relates to a lighting system which controls dimming of a lighting device.

2. Description of the Related Art

Conventionally, a lighting system has been known which controls a dimming level of a lighting device such as an LED light on the ceiling.

For example, according to a dimming control system disclosed in Japanese Unexamined Patent Application Publication No. 2004-349065, a dimming-control parent device transmits, to a dimming-control terminal, a control-target value for adjusting the amount of light emitted from a lighting device. The dimming control parent device stores an operation schedule in which a control-target value and a time to start the control are associated with one another, and transmits the control-target value to the dimming control terminal when the current time comes to the start time.

SUMMARY

According to the above conventional technique, the amount of light emitted from a lighting device is adjusted in accordance with a preset schedule such that the illuminance of a lighting device at a certain time approximates to a control-target value for that time.

For example, from the viewpoint of energy saving, however, the amount of light emitted from the lighting device may be changed or maintained according to not only the current time, but environment items appropriately selected from among various environmental items.

In view of the above conventional problem, the present disclosure describes, in one general aspect, a lighting system which can appropriately dim a lighting device and a method for controlling the lighting system, according to the environment where the lighting device is installed.

Solution to Problem

A lighting system according to an aspect of the present disclosure is a lighting system including: a lighting device which includes a light source and a lighting circuit which causes the light source to provide illumination; a lighting controller which controls dimming of the lighting device by controlling the lighting circuit; and a system controller which controls the lighting controller. The system controller includes: a timer which outputs a counter value indicating a time; a schedule storage for storing schedule information which includes an instruction directed to the lighting controller and a time associated with the instruction; a first communication circuit which transmits information to the lighting controller; and an instruction controller which identifies, from the schedule information, an instruction associated with the time indicated by the counter value, and causes the first communication circuit to transmit control information which includes the identified instruction. The lighting controller includes: a sensor which detects a person in a space where the lighting device is disposed, and brightness of the space; a second communication circuit which receives the control information transmitted from the system controller; and a dimming controller which switches to one of modes that is indicated in the control information from another of the modes and executes the one of the modes, the modes including (a) a human detection mode for controlling the dimming in accordance with a result of human detection by the sensor, (b) a brightness detection mode for controlling the dimming in accordance with a result of detection of the brightness by the sensor, and (c) a dimming level fixed mode for controlling the dimming by maintaining a dimming level at a fixed value.

A method for controlling a lighting system according to an aspect of the present disclosure is a method for controlling a lighting system which includes: a lighting controller which controls dimming of a lighting device; and a system controller which controls the lighting controller. The system controller includes: a timer which outputs a counter value indicating a time; and a schedule storage for storing schedule information which includes an instruction directed to the lighting controller and a time associated with the instruction. The lighting controller includes a sensor which detects a person in a space where the lighting device is disposed, and brightness of the space. The method includes: identifying, by the system controller from the schedule information, an instruction associated with the time indicated by the counter value; transmitting, by the system controller, control information which includes the identified instruction to the lighting controller; receiving, by the lighting controller, the control information transmitted from the system controller; and switching, by the lighting controller, to one of modes that is indicated in the control information from another of the modes, and executing, by the lighting controller, the one of the modes, the modes including (a) a human detection mode for controlling the dimming in accordance with a result of human detection by the sensor, (b) a brightness detection mode for controlling the dimming in accordance with a result of detection of the brightness by the sensor, and (c) a dimming level fixed mode for controlling the dimming by maintaining a dimming level at a fixed value.

The lighting system according to an aspect of the present disclosure can appropriately dim a lighting device according to the environment where the lighting device is installed.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1A:
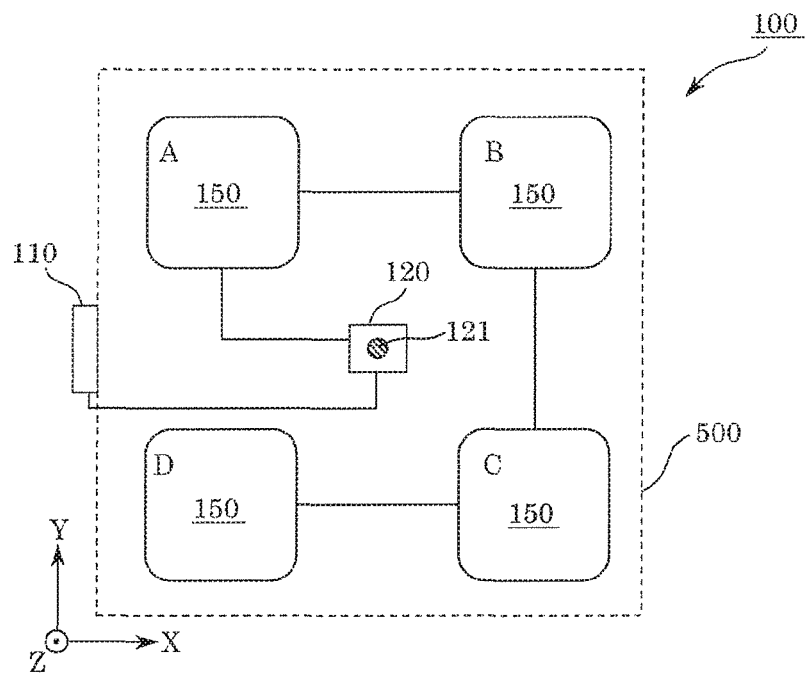
FIG. 1A is a first diagram illustrating a schematic configuration of a lighting system according to an embodiment.

The following describes a lighting system according to an embodiment and variations with reference to the drawings. Note that the embodiment and variations described below each show a specific example of the present disclosure. The numerical values, shapes, materials, constituent elements, the arrangement and connection of the constituent elements, and others indicated in the following embodiment and variations thereof are mere examples, and therefore do not intend to limit the inventive concept. Therefore, among the constituent elements in the following embodiment and variations thereof, constituent elements not recited in any of the independent claims defining the most generic part of the inventive concept are described as arbitrary constituent elements.

Note that the drawings are schematic diagrams, and do not necessarily provide strictly accurate illustration. In the drawings, the same numeral is given to the substantially same configuration, and a redundant description thereof may be omitted or simplified.

Embodiment

The following describes a lighting system according to an embodiment.

[Configuration of Lighting System]

Figure 1B:
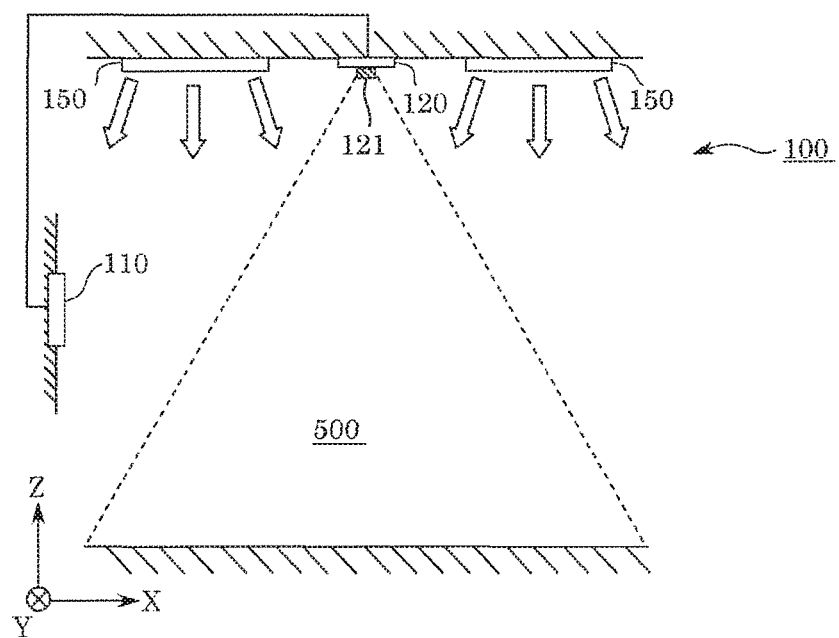
FIG. 1B is a second diagram illustrating a schematic configuration of the lighting system according to the embodiment.
Figure 2:
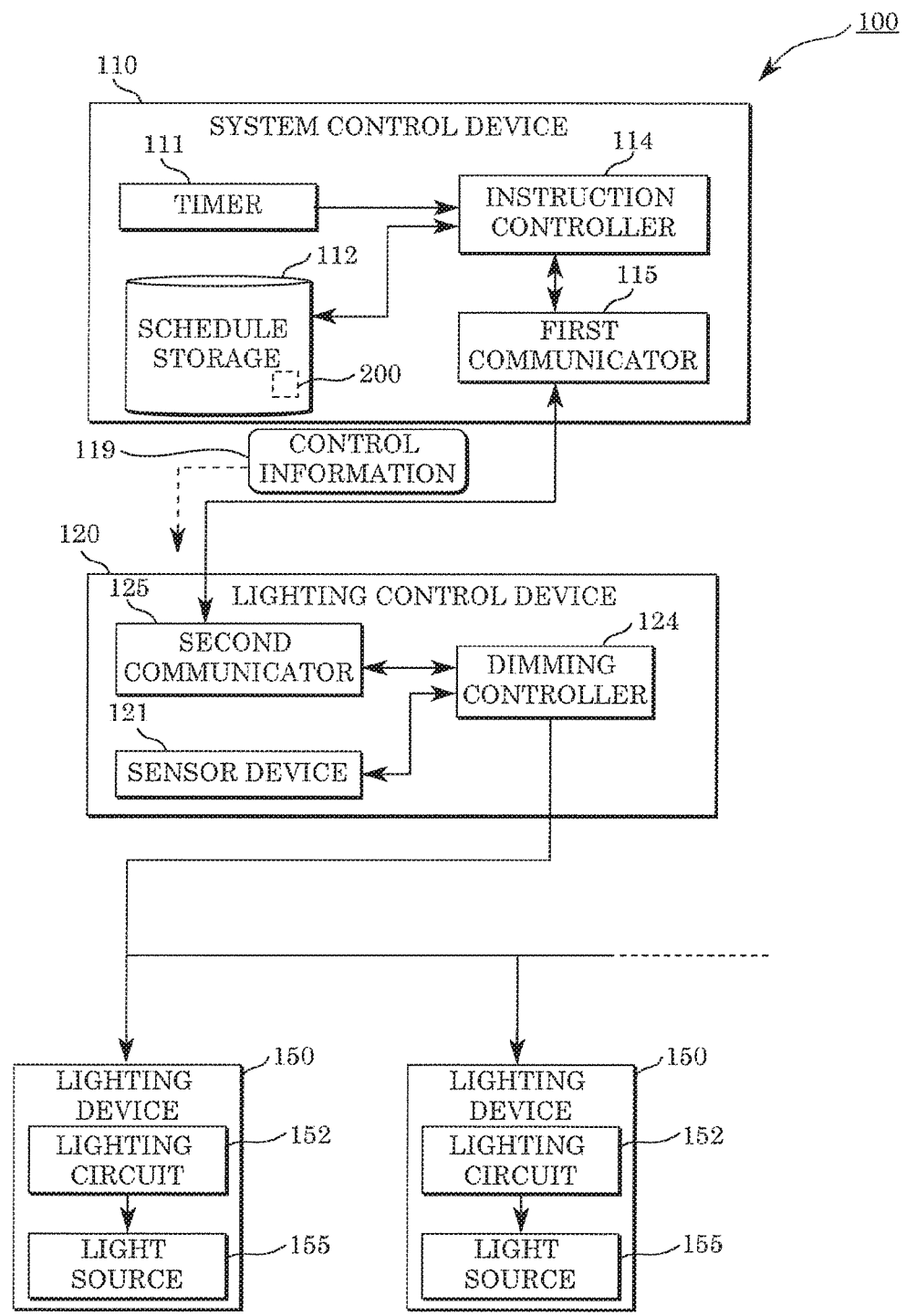
FIG. 2 is a block diagram illustrating a functional configuration of the lighting system according to the embodiment.

The first describes a configuration of a lighting system according to an embodiment with reference to FIGS. 1A, 1B, and 2.

FIG. 1A is a first drawing illustrating a schematic configuration of lighting system 100 according to the embodiment, and FIG. 1B is a second drawing illustrating a schematic configuration of lighting system 100 according to the embodiment.

Specifically, FIG. 1A is a top view illustrating an example of the layout of constituent elements of lighting system 100, and FIG. 1B is a side view corresponding to FIG. 1A. Note that depictions of the lines that connect lighting control device 120 and lighting devices 150 are omitted from FIG. 1B.

While lighting system 100 is installed in a space (room) which needs lighting such as, for example, a room in an office building, depiction of objects which may be present in the space, such as fixtures and persons, are omitted from FIGS. 1A and 1B.

FIG. 2 is a block diagram illustrating a functional configuration of lighting system 100 according to the embodiment.

As illustrated in these drawings, lighting system 100 according to the embodiment includes lighting devices 150, system control device 110, and lighting control device 120.

Note that although FIG. 1A illustrates lighting system 100 which includes four lighting devices 150 labeled with A to D, at least one lighting device 150 may be included in lighting system 100.

Lighting device 150 includes light source 155 and lighting circuit 152 which causes light source 155 to provide illumination.

Lighting device 150 is a ceiling light which includes, for example, a light-emitting device serving as light source 155, which has one or more light emitting diodes (LEDs). In this case, lighting circuit 152 is a drive circuit (light circuit) which controls operation of the light-emitting device, such as turning on and off and dimming the light-emitting device, for example.

System control device 110 controls lighting control device 120. System control device 110 includes timer 111 which outputs a counter value indicating a time, schedule storage 112 for storing schedule information 200, first communicator 115 which transmits information to lighting control device 120, and instruction controller 114.

Schedule information 200 includes an instruction directed to lighting control device 120 and a time associated with the instruction. An example of schedule information 200 will be described below with reference to FIG. 4.

Instruction controller 114 identifies, from schedule information 200, an instruction associated with a time indicated by a counter value output by timer 111, and causes first communicator 115 to transmit control information 119 which includes the identified instruction. Subsequently, lighting control device 120 receives control information 119, and performs operation in accordance with control information 119.

Note that in the present embodiment, system control device 110 is disposed on the wall of a room, as illustrated in FIG. 1B. In this case, system control device 110 may include, for example, a switch for tuning on and off the power for the whole of lighting system 100, a button for generating or updating schedule information 200, and a display panel for showing the state of lighting system 100.

In the present embodiment, for example, system control device 110 which is a device called an operation panel is disposed, and schedule information 200 is generated or updated through user operation on the above button, for instance. Note that schedule information 200 may be generated or updated using information from a communication terminal such as a smartphone. A description of this aspect is later given as Variation 3.

The place where system control device 110 is disposed is not particularly limited, and system control device 110 may be disposed at a place where people cannot see, such as the roof-space, for example. In this case, for example, system control device 110 can receive various instructions from a user through wireless or cable communication between first communicator 115 and a remote control or a mobile terminal, for instance.

Lighting control device 120 controls dimming of lighting device 150 by controlling lighting circuit 152 of lighting device 150. For example, lighting control device 120 gives an instruction about a dimming level to lighting circuit 152, thus performing control (dimming control) for causing lighting device 150 to provide illumination at the dimming level.

Note that a dimming level is a type of a variable for adjusting the brightness of a light, and the brightness of the light increases with an increase in the numerical value of the variable (the maximum value is 100%). Furthermore, the dimming level can also be represented as a "dimming degree" or a "dimming ratio", for example.

For example, if lighting control device 120 gives an instruction indicating a dimming level of "100%" to lighting device 150, lighting control device 120 transmits instruction information corresponding to a dimming level of "100%" to lighting device 150. In accordance with the instruction information, lighting circuit 152 of lighting device 150 controls light source 155 to set the optical output of light source 155 to the maximum output.

Note that lighting circuit 152 controls the optical output of light source 155 according to a pulse width modulation (PWM) signal, for example. However, a technique used for this control is not particularly limited, and dimming of lighting device 150 may be controlled according to a digital signal.

For example, if light source 155 includes a plurality of light emitters such as a plurality of electric bulbs, dimming of light source 155 may be controlled by changing the number of light emitters to be turned on, among the light emitters.

According to the present embodiment, lighting control device 120 is connected with four lighting devices 150 via signal lines (see FIG. 1A), and lighting control device 120 transmits a signal (instruction information) indicating a dimming level through the signal lines, thus causing four lighting devices 150 to provide illumination at the dimming level.

More specifically, lighting control device 120 includes: sensor device 121 which detects a person in a space where lighting device 150 is disposed and detects brightness of the space; second communicator 125 which receives control information 119 transmitted from system control device 110; and dimming controller 124.

Sensor device 121 includes an imaging device in the present embodiment, and detects a person and brightness from image data obtained through imaging by the imaging device.

For example, sensor device 121 images a target indoor space using a solid state image sensor such as a complementary metal-oxide semiconductor (CMOS) image sensor, and detects a person and brightness from image data obtained as a result of the imaging.

Note that the configuration of sensor device 121 is not particularly limited, and sensor device 121 may include two physically separate sensors, namely a human sensing sensor which detects a person and an illuminance sensor which detects brightness, for example.

Dimming controller 124 has features of controlling dimming in various modes including a mode in which a result of detection by sensor device 121 is used, and switching between these modes according to an instruction from system control device 110.

Specifically, dimming controller 124 switches to one of modes, which is indicated in control information 119 received by second communicator 125, from another of the modes and executes the one of the modes, the modes including (a) a human detection mode for controlling dimming in accordance with a result of human detection by sensor device 121, (b) a brightness detection mode for controlling dimming in accordance with a result of brightness detection by sensor device 121, and (c) a dimming level fixed mode for controlling dimming by maintaining a dimming level at a fixed value.

Specifically, dimming controller 124 has a function of switching between modes in accordance with a schedule, such as a mode focusing on the presence of a person, a mode focusing on the detected brightness, and a mode intended to maintain a predetermined dimming level, when controlling dimming to change the brightness of one or more lighting devices 150.

Here, in the present embodiment, illumination region 500 indicated by the dotted rectangle in FIG. 1A is treated as, for example, a space where one or more lighting devices 150 included in lighting system 100 are disposed. In the present embodiment, illumination region 500 can be defined as an internal area of a room where four lighting devices 150 are disposed on the ceiling.

For example, natural light coming in from a window in the wall of the room falls on illumination region 500, and thus the brightness of illumination region 500 also depends on, for example, the weather, in addition to the dimming level of four lighting devices 150.

Note that the layout of lighting system 100 illustrated in FIGS. 1A and 1B is an example, and different layouts may be used. For example, sensor device 121 may be disposed in one of lighting devices 150. In this case, lighting control device 120 except sensor device 121, namely, the body part of lighting control device 120, may be disposed in the ceiling space or on the wall of a room, for example. In other words, sensor device 121 and the body part of lighting control device 120 may be physically separate.

Furthermore, system control device 110 and lighting control device 120 may be achieved as a single device. For example, system control device 110 and lighting control device 120 may be accommodated in an operation panel disposed on the wall. For example, system control device 110 and lighting control device 120 may be accommodated in the body of one of lighting devices 150. In other words, lighting system 100 may be achieved as a lighting device having an equivalent configuration to that of lighting system 100.

Furthermore, various functions of system control device 110 and lighting control device 120 according to the present embodiment may be achieved by software, such as a program executed on a computer which includes, for instance, a central processing unit (CPU), random access memory (RAM), read only memory (ROM), a communication interface, an I/O port, and a hard disk, or may be achieved by hardware such as an electronic circuit. In the present disclosure, these may be collectively referred to as controller or a control circuit.

[Example of Operation of Lighting System]

A description of operation of lighting system 100 having the above configuration is given with reference to FIGS. 3 to 6.

Figure 3:
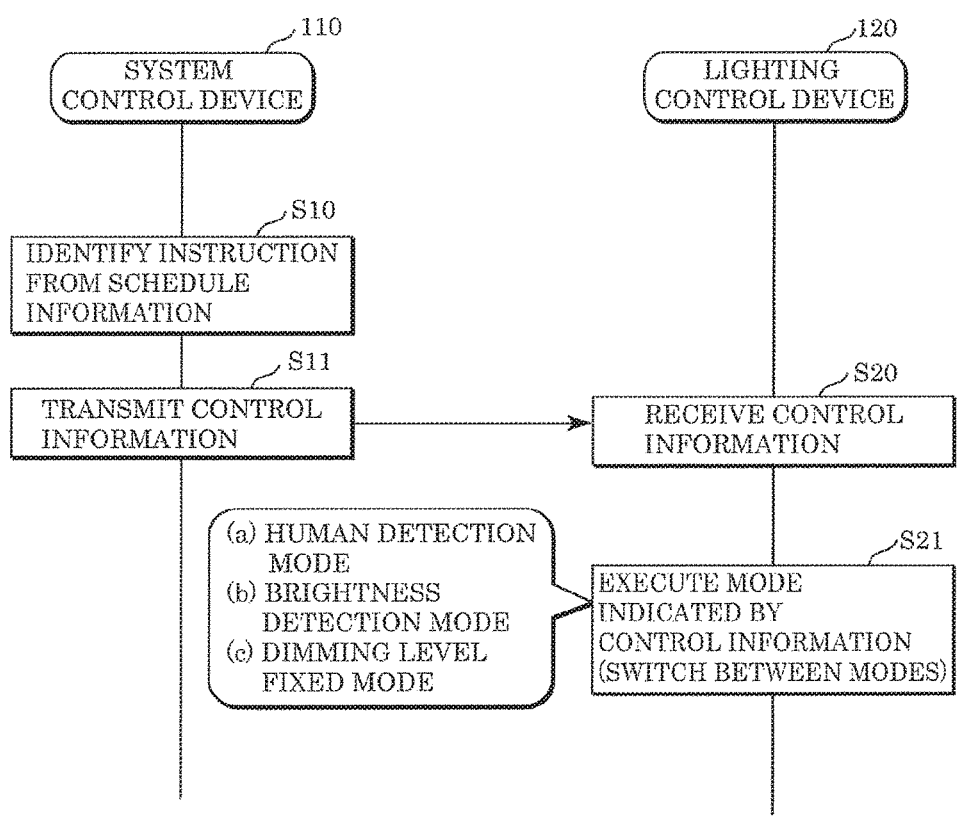
FIG. 3 is a sequence diagram illustrating a flow of basic operation of the lighting system according to the embodiment.
Figure 4:
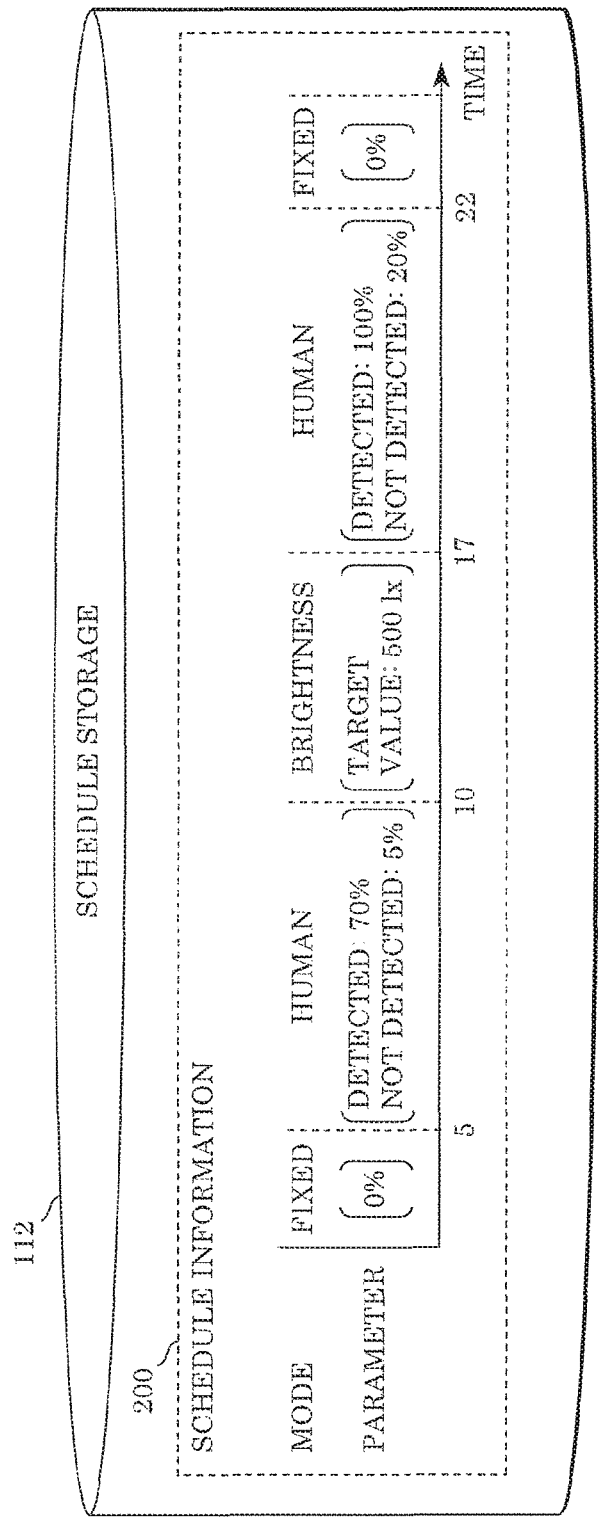
FIG. 4 illustrates an example of schedule information according to the embodiment.

The first describes the flow of basic operation of lighting system 100 with reference to FIGS. 3 and 4.

FIG. 3 is a sequence diagram illustrating the flow of basic operation of lighting system 100 according to the embodiment.

FIG. 4 illustrates an example of schedule information 200 according to the embodiment.

System control device 110 identifies, from schedule information 200, an instruction associated with a time indicated by a counter value output from timer 111 (S10).

For example, instruction controller 114 obtains counter values output from timer 111 at predetermined intervals, and compares a time indicated by an obtained counter value with times to switch between modes (5:00, 10:00, 17:00, and 22:00 in the case of FIG. 4) indicated in schedule information 200 read from schedule storage 112.

If the result of the comparison shows that a time indicated by the obtained counter value matches one of the times to switch between modes, or the obtained counter value indicates a time later than one of the times to switch between modes for the first time within a day (from 0:00 until next 0:00), instruction controller 114 identifies an instruction associated with the time to switch between modes from schedule information 200.

For example, if the counter value obtained by instruction controller 114 indicates "5:00", instruction controller 114 identifies "human detection mode" (see FIG. 4) as an instruction to be given to lighting control device 120.

As illustrated in FIG. 4, in the present embodiment, schedule information 200 includes dimming levels in the human detection mode for when a person is detected and for when no person is detected, and instruction controller 114 identifies parameters in the instruction, which indicate the dimming levels, namely, "70%" and "5%."

System control device 110 further transmits control information 119 which includes the identified instruction to lighting control device 120 (S11).

Specifically, instruction controller 114 causes first communicator 115 to transmit control information 119 which includes the instruction ("human detection mode", "70%", and "5%") identified as described above.

Lighting control device 120 receives control information 119 transmitted from system control device 110 (S20).

Specifically, second communicator 125 receives control information 119, and delivers received control information 119 to dimming controller 124.

Lighting control device 120 switches to one of modes which is indicated in control information 119 from another of the modes and executes the one of the modes, the modes including the human detection mode, the brightness detection mode, and the dimming level fixed mode (S21).

As described above, system control device 110 transmits control information 119 to lighting control device 120 at a timing in accordance with schedule information 200. In this manner, lighting control device 120 can switch between dimming control modes at a timing in accordance with schedule information 200.

Figure 5:
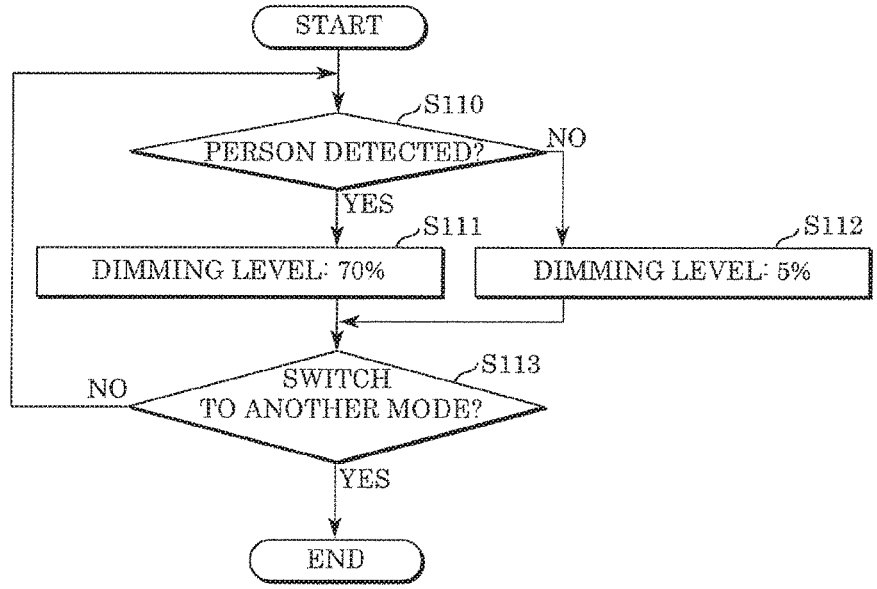
FIG. 5 is a first diagram illustrating an example of a flow of operation of a lighting control device according to the embodiment.
Figure 6:
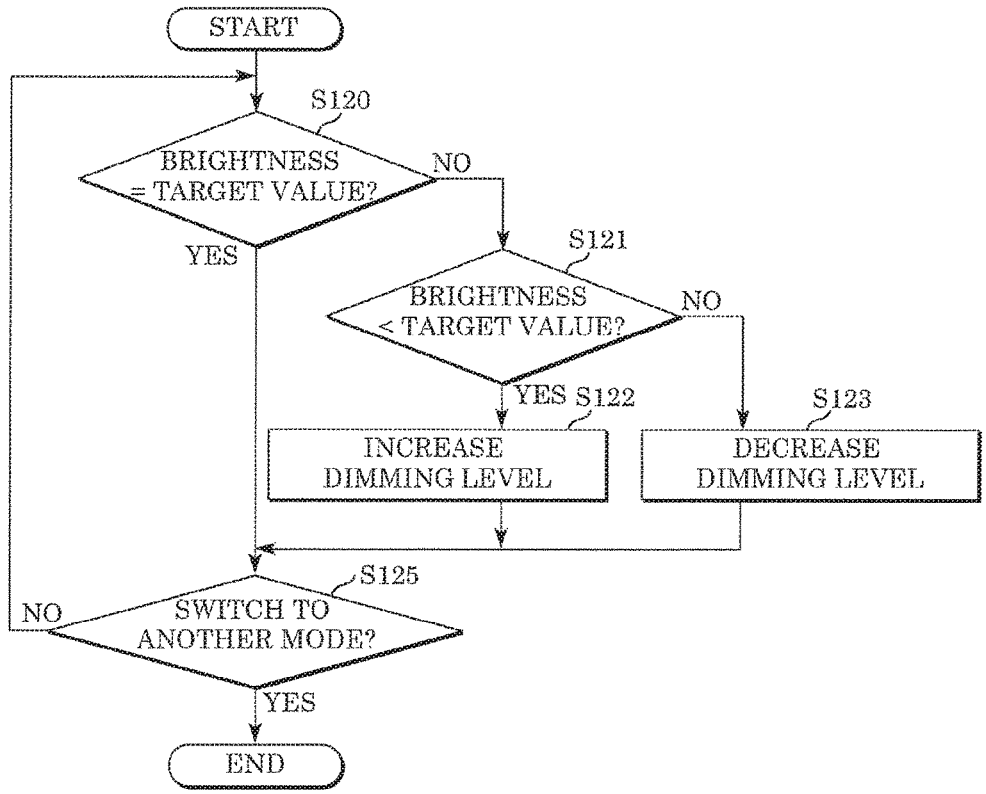
FIG. 6 is a second diagram illustrating an example of a flow of operation of the lighting control device according to the embodiment.

The following describes an example of operation of lighting control device 120, with reference to FIGS. 5 and 6.

FIG. 5 is a first drawing illustrating an example of a flow of operation of lighting control device 120 according to the embodiment, and FIG. 6 is a second drawing illustrating an example of a flow of operation of lighting control device 120 according to the embodiment.

Specifically, FIG. 5 illustrates a processing procedure when lighting control device 120 executes the human detection mode, and FIG. 6 illustrates a processing procedure when lighting control device 120 executes the brightness detection mode.

If received control information 119 indicates the human detection mode, lighting control device 120 changes the dimming level of one or more lighting devices 150 (four lighting devices 150 in the present embodiment), according to a result of human detection by sensor device 121.

Specifically, as illustrated in FIG. 5, if a result of detection by sensor device 121 indicates that a person is detected (YES in S110), dimming controller 124 of lighting control device 120 transmits, to four lighting devices 150, a signal (instruction information) for causing the lighting devices to provide illumination at a dimming level of "70%" (S111).

Consequently, four lighting devices 150 each cause light source 155 to provide illumination at a dimming level of "70%."

Further, if a result of detection by sensor device 121 does not indicate that a person is detected (NO in S110), or in other words, the result indicates that no person is detected, dimming controller 124 transmits, to four lighting devices 150, a signal (instruction information) for causing the lighting devices to provide illumination at a dimming level of "5%" (S112).

Consequently, four lighting devices 150 each cause light source 155 to provide illumination at a dimming level of "5%."

In the present embodiment, as described above, lighting control device 120 performs control for changing the dimming level of one or more lighting devices 150 to two levels in the human detection mode, according to whether a person is detected or not detected. If lighting control device 120 does not make a switch to another mode (NO in S113), lighting control device 120 controls dimming in the human detection mode continuously. After that, if control information 119 received by second communicator 125 of lighting control device 120 indicates another mode, lighting control device 120 switches the operation to the other mode (YES in S113).

For example, when the time becomes 10:00 a.m., system control device 110 transmits control information 119 indicating the "brightness detection mode" to lighting control device 120. Control information 119 also includes, as a parameter, information indicating "500 lx" that is a target value of brightness, for example (see S10 and S11 in FIG. 3, and FIG. 4).

Consequently, lighting control device 120 switches the dimming control mode from the human detection mode to the brightness detection mode.

In this case, lighting control device 120 changes the dimming level of one or more lighting devices 150, according to the result of brightness detection by sensor device 121.

Specifically, as illustrated in FIG. 6, if the brightness shown by the detection result of sensor device 121 (illuminance in the present embodiment) does not match the target value "500 lx" (NO in S120), the dimming level is changed according to a magnitude relation between the brightness shown by the detection result and the target value "500 lx."

In other words, if the brightness shown by the detection result is lower than the target value "500 lx" (YES in S121), dimming controller 124 controls four lighting devices 150 to increase the dimming level (S122). For example, if the dimming level indicated in the most previous instruction given to four lighting devices 150 is 70%, dimming controller 124 transmits a signal (instruction information) to four lighting devices 150 in order to cause the lighting devices to provide illumination at a dimming level higher than 70% (for example, 75%).

If the brightness shown by the detection result is higher than the target value "500 lx" (NO in S121), dimming controller 124 controls four lighting devices 150 to lower the dimming level of the lighting devices (S123). For example, if the dimming level indicated in the most previous instruction given to four lighting devices 150 is 70%, dimming controller 124 transmits a signal (instruction information) to four lighting devices 150 to cause the lighting devices to provide illumination at a dimming level lower than 70% (for example, 65%).

In the present embodiment, as described above, lighting control device 120 detects the brightness of a space where one or more lighting devices 150 under control are disposed, and performs control for changing the dimming level of one or more lighting devices 150 in the brightness detection mode to make the detected brightness approximate to the target value. If lighting control device 120 does not make a switch to another mode (NO in S125), lighting control device 120 controls dimming in the brightness detection mode continuously.

After that, if control information 119 received by second communicator 125 of lighting control device 120 indicates another mode, lighting control device 120 switches the operation to the other mode (YES in S125).

For example, when the time becomes 5:00 p.m. (17:00), system control device 110 transmits to lighting control device 120 control information 119 indicating the "human detection mode." Furthermore, control information 119 includes, as a parameter, information indicating, for example, a dimming level of "100%" for when a person is detected and a dimming level of "20%" for when no person is detected (see S10 and S11 in FIG. 3, and FIG. 4).

As a result, lighting control device 120 switches the dimming control mode from the brightness detection mode to the human detection mode. In this case, lighting control device 120 changes the dimming level of four lighting devices 150 according to the result of human detection by sensor device 121. Specifically, lighting control device 120 executes operation which is the same as the operation illustrated in FIG. 5 except that dimming levels of "70%" and "5%" in FIG. 5 are replaced with "100%" and "20%", respectively.

After that, when the time becomes 10:00 p.m. (22:00), for example, system control device 110 transmits, to lighting control device 120, control information 119 indicating the "dimming level fixed mode." Control information 119 includes, as a parameter, information indicating a dimming level of "0%", for example (see S10 and S11 in FIG. 3 and FIG. 4).

As a result, dimming controller 124 of lighting control device 120 transmits a signal (instruction information) to four lighting devices 150 to cause the lighting devices to provide illumination at a dimming level of "0%." In other words, lighting control device 120 transmits instruction information to four lighting devices 150 to turn off the lighting devices, and four lighting devices 150 each turn off light source 155, according to the instruction information.

Note that in the operation illustrated in FIG. 6, dimming controller 124 does not need to determine whether the brightness shown by the result of detection by sensor device 121 is exactly the same as the target value. For example, if the brightness shown by the detection result is in a range plus and minus several percent (for example, 5%) from the target value, dimming controller 124 may determine that the brightness shown by the detection result matches the target value (YES in S120).

In such a case, dimming controller 124 may determine in a similar manner whether (a value indicating) the brightness shown by the detection result is lower than the target value (S121). In other words, if the brightness shown by the detection result is lower than, for example, a value that is 95% of the target value, dimming controller 124 may determine that (the value indicating) the brightness is lower than the target value (YES in S121).

Feedback control (S120, S121, S122, S123) for thus making the brightness shown by the detection result fall within a predetermined range which includes a target value is an example of dimming control for making the brightness indicated by the detection result approximate to the target value.

As described above, lighting system 100 according to the present embodiment includes lighting device 150, lighting control device 120 which controls dimming of lighting device 150, and system control device 110 which controls lighting control device 120.

System control device 110 identifies an instruction to be given to lighting control device 120 from the time indicated by the counter value of timer 111 and schedule information 200, and transmits to lighting control device 120 control information 119 which includes the identified instruction.

Lighting control device 120 includes sensor device 121 which detects a person in a space where lighting device 150 is disposed and brightness of the space, second communicator 125 which receives control information 119, and dimming controller 124.

Dimming controller 124 switches to one of modes, which is indicated by control information 119 received by second communicator 125, from another of the modes and executes the one of the modes, the modes including the human detection mode, the brightness detection mode, and the dimming level fixed mode.

In this manner, dimming of lighting device 150 is controlled, during the morning, in the human detection mode which focuses on whether a person is present in the space, for example. Thus, if a person is present, an area where the person moves can be brightly illuminated by making the dimming level of lighting device 150 comparatively high. Furthermore, if a person is not present, minimum brightness, which is determined taking into consideration a possibility of a person coming into the space, for example, can be secured by making the dimming level of lighting device 150 comparatively low, while keeping power consumption low.

Dimming of lighting device 150 is controlled, during the daytime, in the brightness detection mode which focuses on the brightness of the space, rather than a person. In other words, the dimming level of lighting device 150 is adjusted to maintain, for example, appropriate brightness for human activity, taking into consideration the environment light at the place where lighting system 100 is installed.

In this manner, for example, in a state where sunlight coming in from a window maintains sufficient brightness of the space, the dimming level of lighting device 150 is made comparatively low even if a person is present in the space, which consequently keeps power consumption low.

During the night, dimming of lighting device 150 is controlled in the dimming level fixed mode intended to maintain a predetermined dimming level. For example, assuming that no person is present in the space, lighting control device 120 operates to maintain the dimming level of lighting device 150 at "0%."

In this manner, lighting system 100 according to the present embodiment changes or maintains the dimming level according to an environmental item appropriately selected for each of time-series sections from among various environmental items (such as whether a person is present, brightness, and use condition of a target space). Accordingly, lighting system 100 can appropriately dim lighting device 150 according to the environment where lighting device 150 is installed.

Furthermore, in the present embodiment, instruction controller 114 causes first communicator 115 to transmit, if the identified instruction indicates the human detection mode, control information 119 which includes parameters indicating dimming levels for the human detection mode for when a person is detected and for when no person is detected. If control information 119 indicates the human detection mode, dimming controller 124 controls dimming, using a dimming level indicated by a parameter according to the result of human detection by sensor device 121.

In this manner, even if dimming controller 124 controls dimming in the "human detection mode" during both the morning and night, dimming controller 124 can adjust the dimming level for when a person is detected during the nighttime to, for example, a value greater than the dimming level for when a person is detected during the morning.

In other words, in the human detection mode which focuses on whether a person is present, dimming can be controlled more precisely, taking into consideration the amount of light coming in from a window, for example.

In the present embodiment, if the identified instruction indicates the brightness detection mode, instruction controller 114 causes first communicator 115 to transmit control information 119 which includes a parameter indicating a target value representing target brightness. If control information 119 indicates the brightness detection mode, dimming controller 124 controls dimming to make the brightness detected by sensor device 121 approximate to the target value indicated by the parameter.

In this manner, for example, if lighting system 100 is installed in a space where precise operations are performed, the target value is set to a comparatively large value, thus maintaining the brightness of the space suitable for the precise operations.

Lighting system 100 according to the embodiment may have a configuration for controlling dimming of one or more lighting devices 150 other than the configuration described with reference to FIGS. 1A to 6. The following describes variations of lighting system 100, focusing on differences in configuration from the above-described embodiment.

Variation 1

Figure 7:
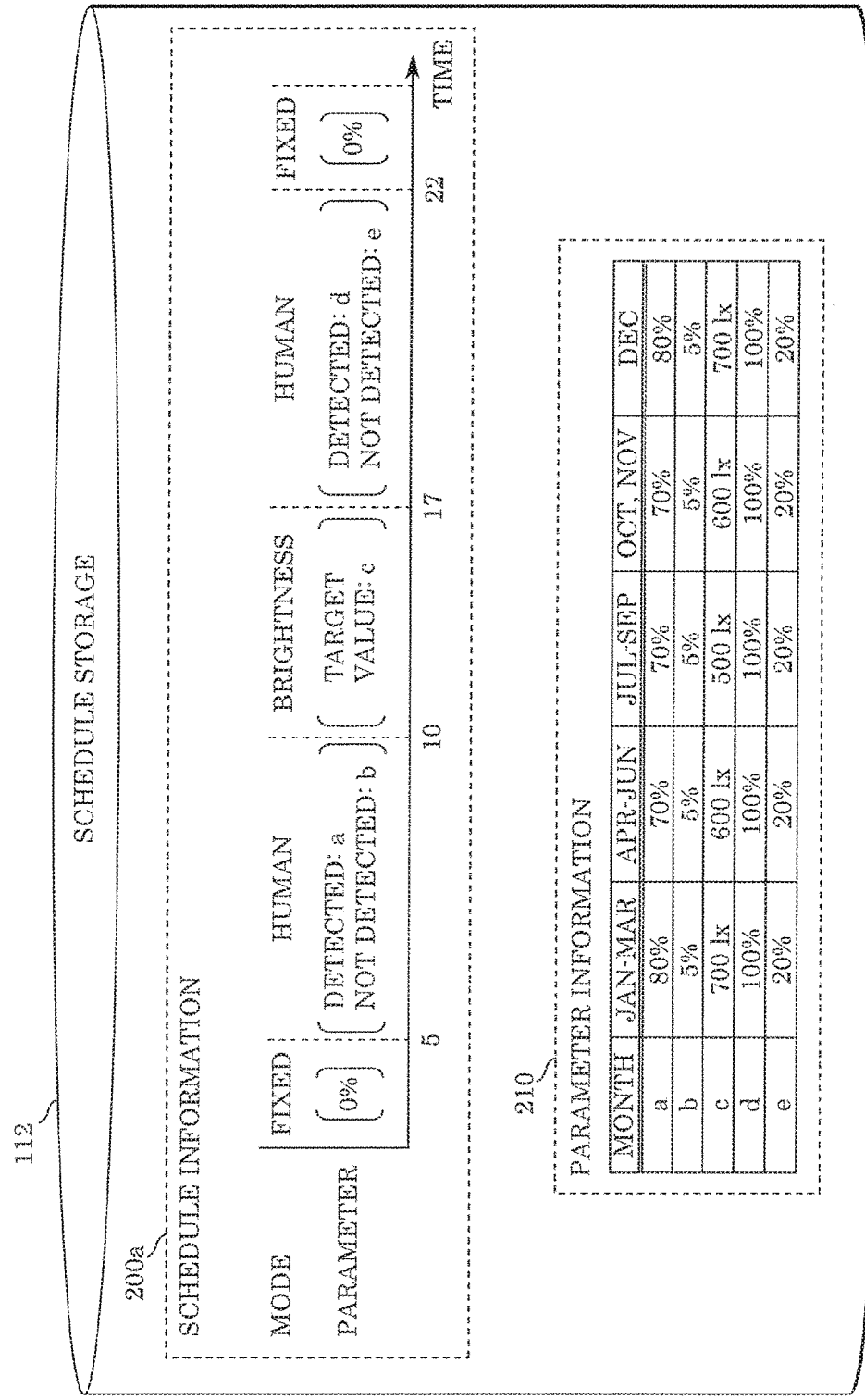
FIG. 7 illustrates an example of schedule information and an example of parameter information according to Variation 1 of the embodiment.

FIG. 7 illustrates an example of schedule information 200a and an example of parameter information 210 according to Variation 1 of the embodiment.

In schedule information 200a illustrated in FIG. 7, parameters for the human detection mode and the brightness detection mode are designated by symbols (a to e), and parameter information 210 includes parameters (numerical values) corresponding to the symbols.

Parameter information 210 indicates parameters associated with periods. Specifically, parameter information 210 indicates various parameters associated with periods in units of month, such as a period from January to March.

In this variation, timer 111 of system control device 110 outputs a counter value indicating a time and at least day and month of a date. For example, timer 111 outputs a counter value which includes a date and a time (for example, "2015.01.30, 12:58").

Instruction controller 114 of system control device 110 reads, from parameter information 210, a parameter associated with a period which includes at least one of month and day indicated by a counter value, and causes first communicator 115 to transmit control information 119 which includes the read parameter.

For example, when a counter value output from timer 111 indicates "2015.01.30, 10:00", instruction controller 114 reads the "brightness mode" and "target value: c" associated with time "10:00" from schedule information 200a. Instruction controller 114 further reads, from parameter information 210, parameter "700 lx" associated with "January" which is the month indicated by the counter value and "target value: c" read from schedule information 200a.

Instruction controller 114 causes first communicator 115 to transmit control information 119 which includes the instruction identified as described above ("brightness detection mode" and "700 lx").

Second communicator 125 of lighting control device 120 receives control information 119 transmitted from first communicator 115. Consequently, dimming controller 124 controls dimming of four lighting devices 150 to make the brightness detected by sensor device 121 approximate to the target value "700 lx" (see FIG. 6).

As described above, system control device 110 has schedule information 200a designating a mode for each time of day, and parameter information 210 designating a parameter for use in each mode for each period. In this manner, for example, system control device 110 can provide, for each season for the same mode, lighting control device 120 with a parameter suitable for the season.

For example, parameter information 210 illustrated in FIG. 7 shows that a dimming level for when a person is detected is "80%" in a period from December to March next year (winter period), and is "70%" in a period from April to November (spring to autumn period), in the human detection mode executed during the morning.

In other words, in the spring to autumn period when the sun rises earlier than winter, securing brightness necessary for human activity and reduction in power consumption can be both achieved by making the dimming level for when a person is detected in this period lower than the dimming level for the winter period.

In this manner, lighting system 100 according to this variation can more precisely adjust parameters for dimming control, according to, for example, a change in natural environment, thus saving more energy, for example.

Note that although the dimming level for the dimming level fixed mode is fixed at "0%" in FIG. 7, parameter information 210 may define, also for the dimming level designated in the dimming level fixed mode, different values for periods as with parameters for other modes.

Furthermore, time-series sections in parameter information 210 may not be in units of month, and may be in units of day, units of year, or units of 20 day of week.

Variation 2

Figure 8:
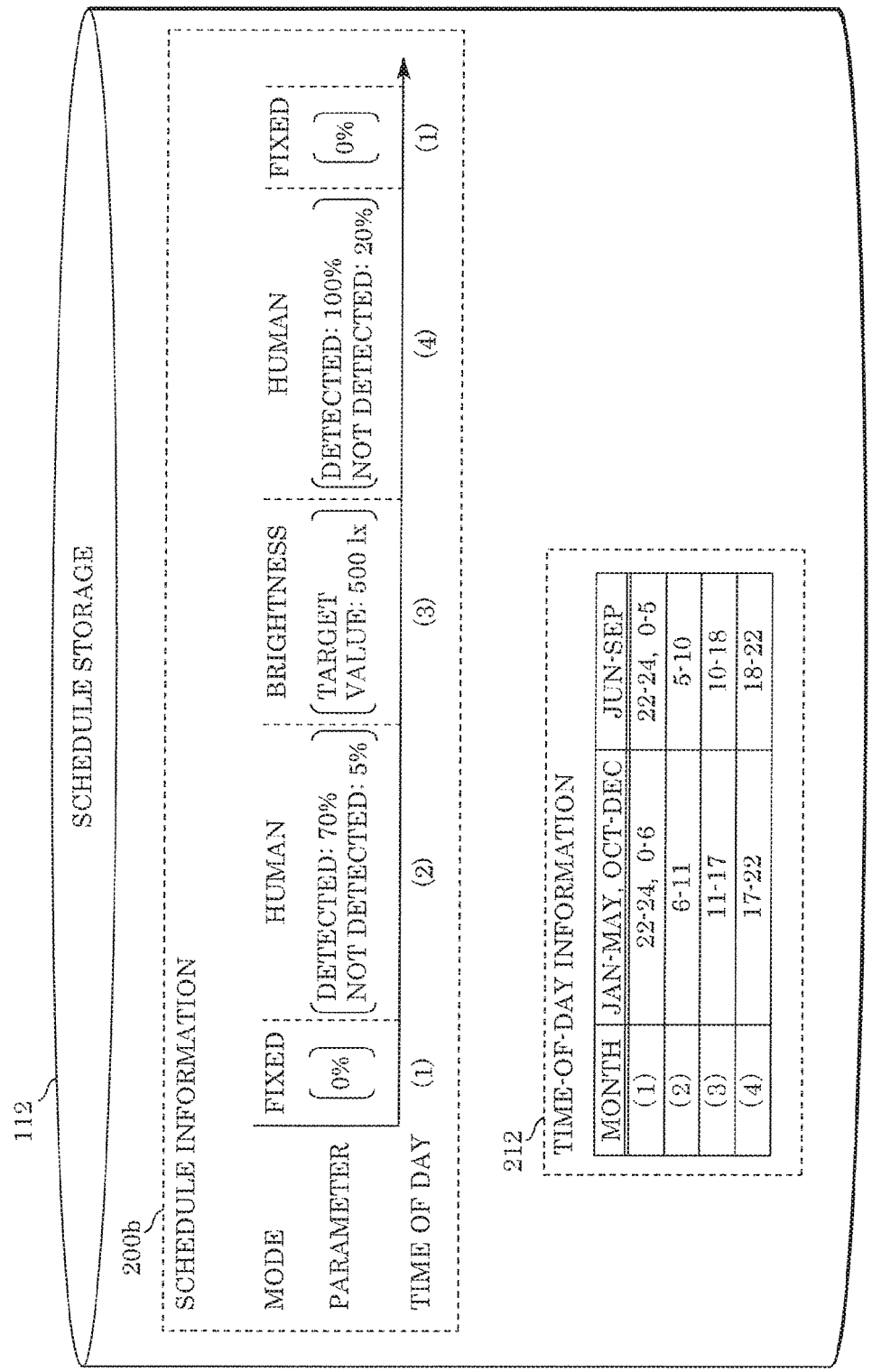
FIG. 8 illustrates an example of schedule information and an example of time-of-day information according to Variation 2 of the embodiment.

FIG. 8 illustrates an example of schedule information 200b and an example of time-of-day information 212 according to Variation 2 of the embodiment.

Schedule information 200b illustrated in FIG. 8 includes instructions directed to lighting control device 120, and identifiers ((1) to (4)) associated with the instructions and tied with times. Time-of-day information 212 includes times associated with the identifiers.

Time-of-day information 212 indicates times of day associated with periods and identifiers. Specifically, periods in units of month, such as a period from January through May, are associated with times of day associated with identifiers, such as 22:00 to 24:00, in time-of-day information 212.

In this variation, timer 111 of system control device 110 outputs a time and at least month and day of a date.

Instruction controller 114 of system control device 110 identifies, from time-of-day information 212, an identifier for a period which includes at least one of month and day indicated by a counter value and a time indicated by the counter value.

Instruction controller 114 further identifies, from schedule information 200b, a mode associated with the identified identifier, for instance.

For example, if a counter value output from timer 111 shows "2015.01.30, 10:00", instruction controller 114 identifies "(2)" which is an identifier corresponding to January and 10:00, from time-of-day information 212.

Instruction controller 114 further identifies, from schedule information 200b, "human detection mode", "70%", and "5%", which are included in an instruction associated with identifier "(2)." Instruction controller 114 causes first communicator 115 to transmit control information 119 which includes the identified instruction ("human detection mode", "70%", and "5%").

Second communicator 125 of lighting control device 120 receives control information 119 transmitted from first communicator 115. As a result, dimming controller 124 controls dimming of four lighting devices 150, in accordance with the result of human detection by sensor device 121 (see FIG. 5).

As described above, system control device 110 has schedule information 200b which specifies instructions associated with times of day, and time-of-day information 212 which specifies times of day associated with periods. In this manner, for example, in the case where lighting control device 120 is caused to execute a predetermined mode during a predetermined time of day, the predetermined time of day can be changed, extended, or shortened to fall within a range suitable for a season.

For example, time-of-day information 212 illustrated in FIG. 8 defines morning hours (a time of day indicated by identifier (2)) of a period (June to September) which includes summer, one hour earlier than morning hours of other periods (January to May, and October to December).

In other words, by setting morning hours slightly earlier for a period (June to September) when the sun rises comparatively early in a year, lighting control device 120 can control dimming in an appropriate mode that suits a time when a person starts activity, for example.

Variation 3

Figure 9:
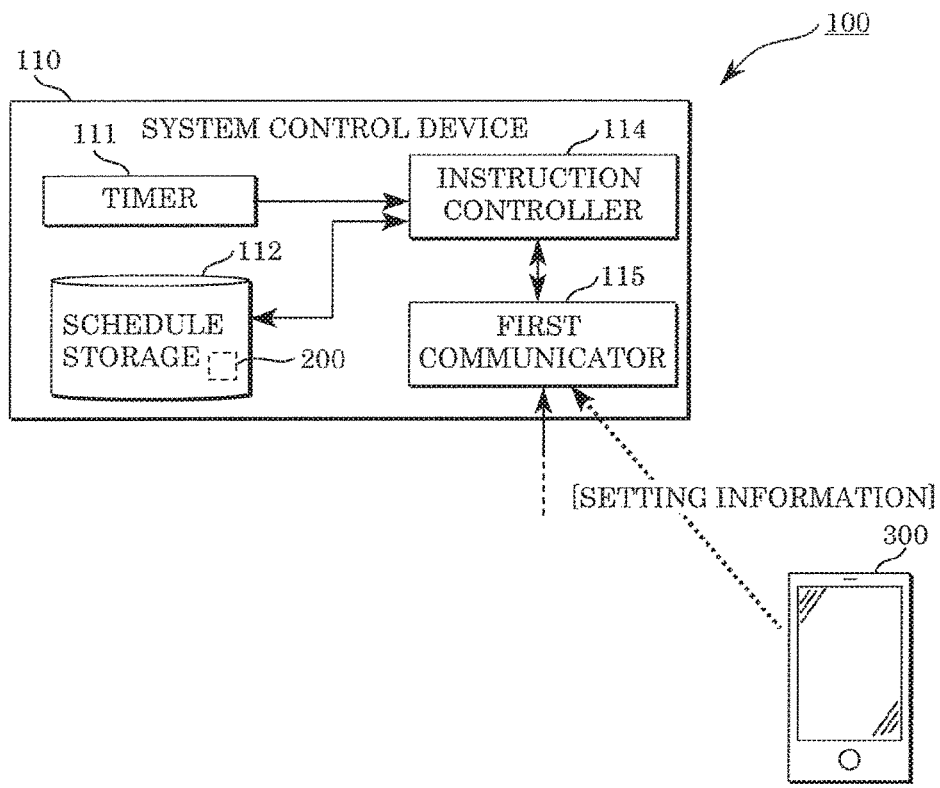
FIG. 9 illustrates a system control device and a communication terminal according to Variation 3 of the embodiment.

FIG. 9 illustrates system control device 110 and communication terminal 300 according to Variation 3 of the embodiment.

Figure 10:
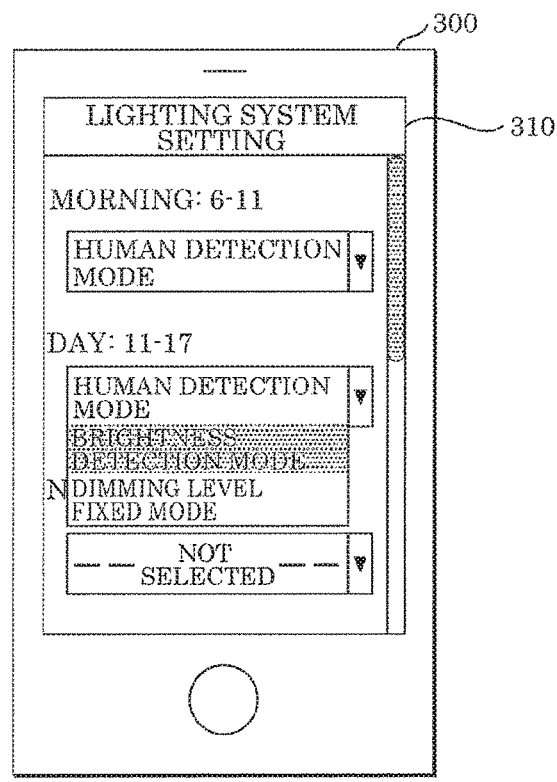
FIG. 10 illustrates an example of a lighting system setting screen displayed by the communication terminal according to Variation 3 of the embodiment.

FIG. 10 illustrates an example of a lighting system setting screen displayed on communication terminal 300 according to Variation 3 of the embodiment.

In system control device 110 according to Variation 3 illustrated in FIG. 9, first communicator 115 receives setting information for controlling operation of lighting device 150, which is transmitted from communication terminal 300.

Instruction controller 114 generates or updates schedule information 200, using the setting information received by first communicator 115, and causes schedule storage 112 to store generated or updated schedule information 200.

Communication terminal 300 is a terminal device having an information display function, and can be achieved by a smartphone, a tablet terminal, or a personal computer, for example. Communication terminal 300 has display panel 310, a CPU, a communication interface, and others, and a function of executing an application program.

How information is transmitted and received by communication terminal 300 and first communicator 115 is not particularly limited, and one of various communication standards, such as Wi-Fi (registered trademark) and Bluetooth (registered trademark), is used to transmit and receive information.

The matters with regard to communication terminal 300 described above also apply to Variations 4 and 5 later described.

In this variation, communication terminal 300 is a mobile terminal device typically called a smartphone, and has an application program for setting details of schedule information 200. Communication terminal 300 displays, on display panel 310, for example, a lighting system setting screen (hereinafter, referred to as "setting screen") as illustrated in FIG. 10, as a user interface.

For example, a user designates, for each of the times of day, a mode for the time of day via a setting screen, and performs a predetermined operation such as pressing a transmission button displayed on the setting screen, thus transmitting information indicating, for instance, a mode designated via the setting screen, to system control device 110 as setting information. In this variation, setting information is transmitted from communication terminal 300 to system control device 110 through wireless communication.

Note that although FIG. 10 illustrates a screen for a user to select a mode for a fixed time of day such as "morning: 6-11", the user may make selection or input for items other than modes.

For example, the start and the end of a time of day may be displayed on the setting screen as items that can be selected or input by a user. Furthermore, a set (hereinafter, referred to as a "mode set") that includes times of day and modes associated with the times of day may be transmitted to system control device 110 as setting information, by a user simply selecting or inputting a setting name such as "summer setting" or "energy saving priority setting."

Note that communication terminal 300 may transmit, to system control device 110, information indicating a setting name, such as "summer setting" or "energy saving priority setting", as setting information. In this case, if system control device 110 has stored a mode set corresponding to the setting name, instruction controller 114 can identify a mode set for use in generation or update of schedule information 200, according to the setting name indicated by the setting information.

Accordingly, in this variation, schedule information 200 is generated or updated based on setting information transmitted from communication terminal 300. This allows, for instance, schedule information 200 to be generated with use of, for example, a multifunctional inputter (such as a software/hardware keyboard) included in communication terminal 300.

Thus, efficiency of generation or update of schedule information 200 is increased, and thus schedule information 200 can be readily edited according to a time of day or a season, for example.

Variation 4

Figure 11:
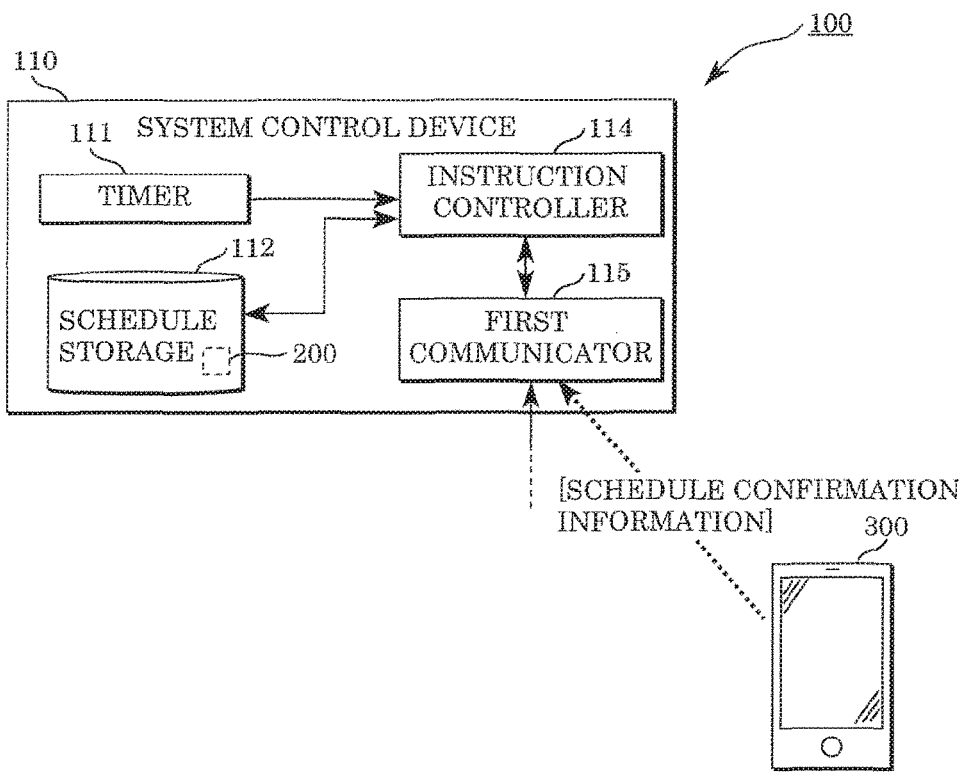
FIG. 11 illustrates a system control device and a communication terminal according to Variation 4 of the embodiment.

FIG. 11 illustrates system control device 110 and communication terminal 300 according to Variation 4 of the embodiment.

Figure 12:
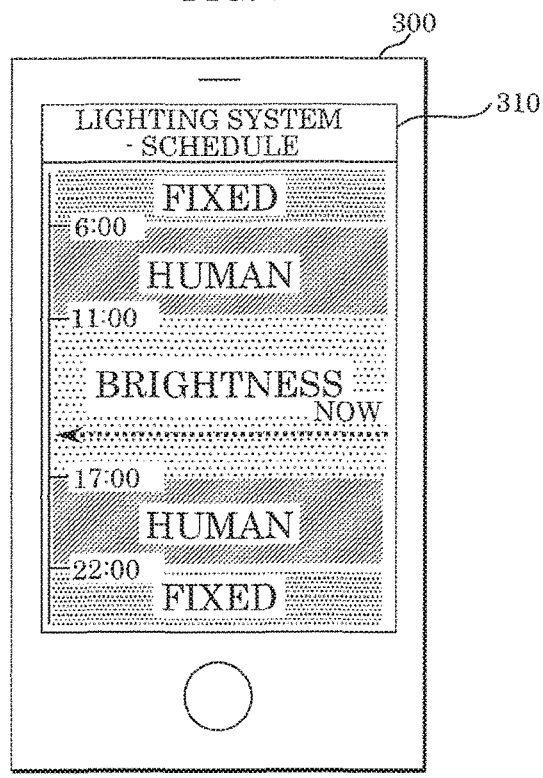
FIG. 12 illustrates an example of a schedule confirmation screen displayed by the communication terminal according to Variation 4 of the embodiment.

FIG. 12 illustrates an example of a schedule confirmation screen displayed on communication terminal 300 according to Variation 4 of the embodiment.

In system control device 110 according to Variation 4 illustrated in FIG. 11, first communicator 115 transmits at least a part of schedule information 200 stored in schedule storage 112, to communication terminal 300.

In this variation, communication terminal 300 has an application program for requesting schedule confirmation information and generating a schedule confirmation screen, using the received schedule confirmation information.

The user performs a predetermined operation such as pressing a request button displayed after the application program is activated, for example. In this manner, communication terminal 300 transmits, to system control device 110, a request for schedule confirmation information.

If first communicator 115 receives the request, instruction controller 114 reads at least a part of schedule information 200 from schedule storage 112. First communicator 115 transmits the at least one read part to communication terminal 300 as schedule confirmation information.

Note that if a part of schedule information 200 is transmitted as schedule confirmation information, instruction controller 114 may transmit to communication terminal 300, using first communicator 115, a predetermined portion of schedule information 200 on the basis of the current time, for example.

In this manner, schedule confirmation information is transmitted from system control device 110 to communication terminal 300, and thus communication terminal 300 can display, on display panel 310, a schedule confirmation screen as illustrated in FIG. 12, for example.

The schedule confirmation screen illustrated in FIG. 12 shows a schedule for switching between modes on a single day, and indicates where in the schedule the current time is at.

In this manner, the user can check with ease which mode is used to control dimming of one or more lighting devices 150 throughout the day. Furthermore, the example illustrated in FIG. 12 shows that a user can check which mode is currently used to control dimming of one or more lighting devices 150.

This consequently facilitates checking whether the entire schedule which has been set at the point in time is appropriate or whether a dimming control mode being executed at the point in time is appropriate, for example.

Note that although the schedule confirmation screen in FIG. 12 shows text which identifies types of modes such as "human" and "brightness", these do not need to be expressed by text and, for example, icons associated with such modes may be displayed on the schedule confirmation screen.

Further, the schedule confirmation screen may show parameters used for modes (a dimming level for when a person is detected or a target value of brightness).

First communicator 115 may transmit schedule confirmation information to communication terminal 300, independently of a request from communication terminal 300. First communicator 115 may transmit schedule confirmation information, for example, at regular intervals or upon the occurrence of an event, such as switching between modes (transmission of control information 119), which is a trigger.

Variation 5

Figure 13:
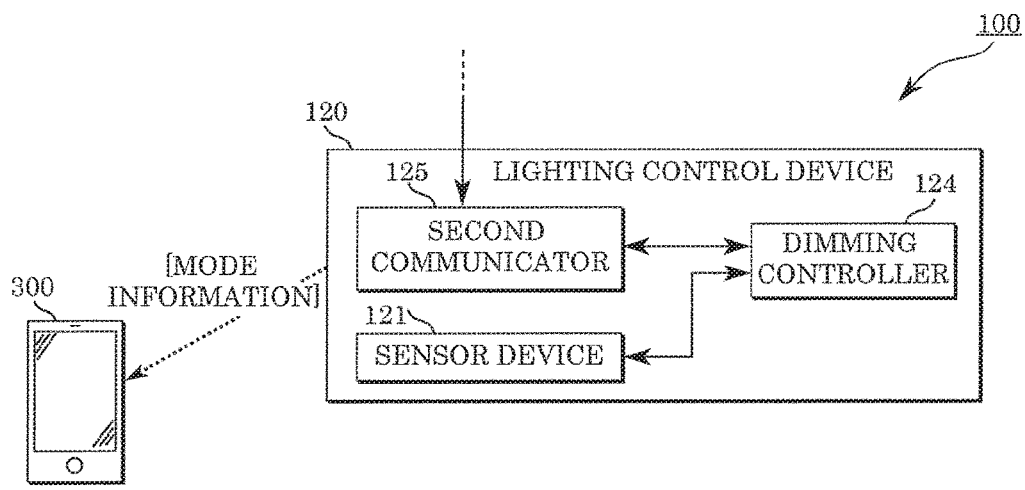
FIG. 13 illustrates a lighting control device and a communication terminal according to Variation 5 of the embodiment.

FIG. 13 illustrates lighting control device 120 and communication terminal 300 according to Variation 5 of the embodiment.

Figure 14:
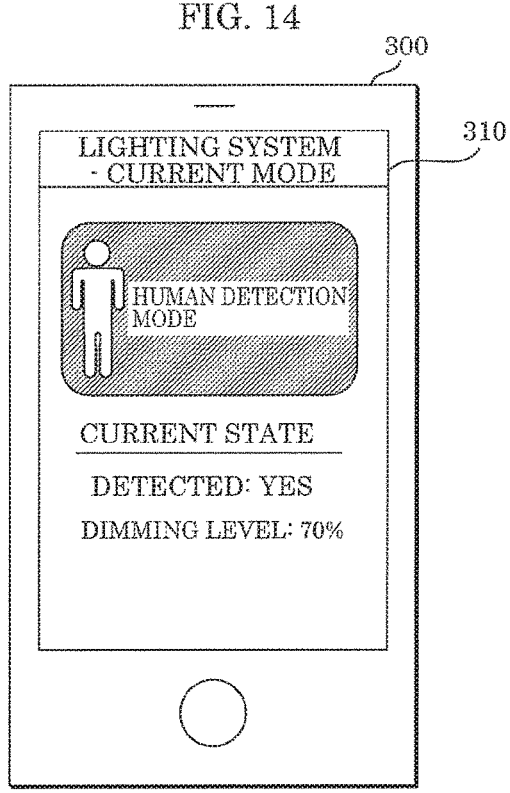
FIG. 14 illustrates an example of a mode confirmation screen displayed by the communication terminal according to Variation 5 of the embodiment.

FIG. 14 illustrates an example of a mode confirmation screen displayed on communication terminal 300 according to Variation 5 of the embodiment.

Second communicator 125 of lighting control device 120 according to Variation 5 illustrated in FIG. 13 transmits, to communication terminal 300 which communicates with second communicator 125, mode information indicating which mode among the human detection mode, the brightness detection mode, and the dimming level fixed mode dimming controller 124 is executing.

In this variation, communication terminal 300 has an application program for requesting mode information and generating a mode confirmation screen, using the received mode information.

For example, a user performs a predetermined operation such as pressing a request button which is displayed after the application program is activated. In this manner, communication terminal 300 transmits to system control device 110 a request for mode information.

If second communicator 125 receives the request, dimming controller 124 of lighting control device 120 transmits, to communication terminal 300, mode information which indicates a mode that is being executed at the point in time (mode identification information such as a mode name or a mode ID), using second communicator 125.

In this manner, communication terminal 300 which has received the mode information can display a mode confirmation screen as illustrated in FIG. 14 on display panel 310, for example.

The mode confirmation screen illustrated in FIG. 14 shows which mode is being currently executed. Furthermore, this mode confirmation screen shows that the human detection mode is being executed, a person has been detected by this moment, and the dimming level is "70%." In other words, the mode information transmitted from second communicator 125 includes information such as a dimming level at the time when the request is transmitted.

In this manner, the user can check with ease the type of a current mode and the details of the mode, thus facilitating checking whether the dimming control mode being executed at the point in time is appropriate.

Note that although the mode confirmation screen illustrated in FIG. 14 shows a current state such as a dimming level as well, communication terminal 300 may output information indicating at least a mode that is being currently executed, based on the received mode information.

Furthermore, system control device 110 may be a transmitter of mode information, rather than lighting control device 120. In other words, system control device 110 includes timer 111 for checking the current time and schedule information 200 which includes an instruction directed to lighting control device 120, and can be indirectly informed of which mode lighting control device 120 is executing at a given point in time. Accordingly, system control device 110 can transmit mode information to communication terminal 300.

Specifically, at least one communicator among first communicator 115 and second communicator 125 may transmit, to communication terminal 300 which communicates with the at least one communicator, mode information indicating which mode among the human detection mode, the brightness detection mode, and the dimming level fixed mode dimming controller 124 is executing.

Note that first communicator 115 or second communicator 125 may transmit mode information to communication terminal 300, independently of a request from communication terminal 300. First communicator 115 or second communicator 125 may transmit mode information at regular intervals, for example.

Furthermore, for example, second communicator 125 may transmit mode information upon a change in a dimming level in a certain mode or the occurrence of an event such as switching between modes, which is a trigger.

Variation 6

Figure 15:
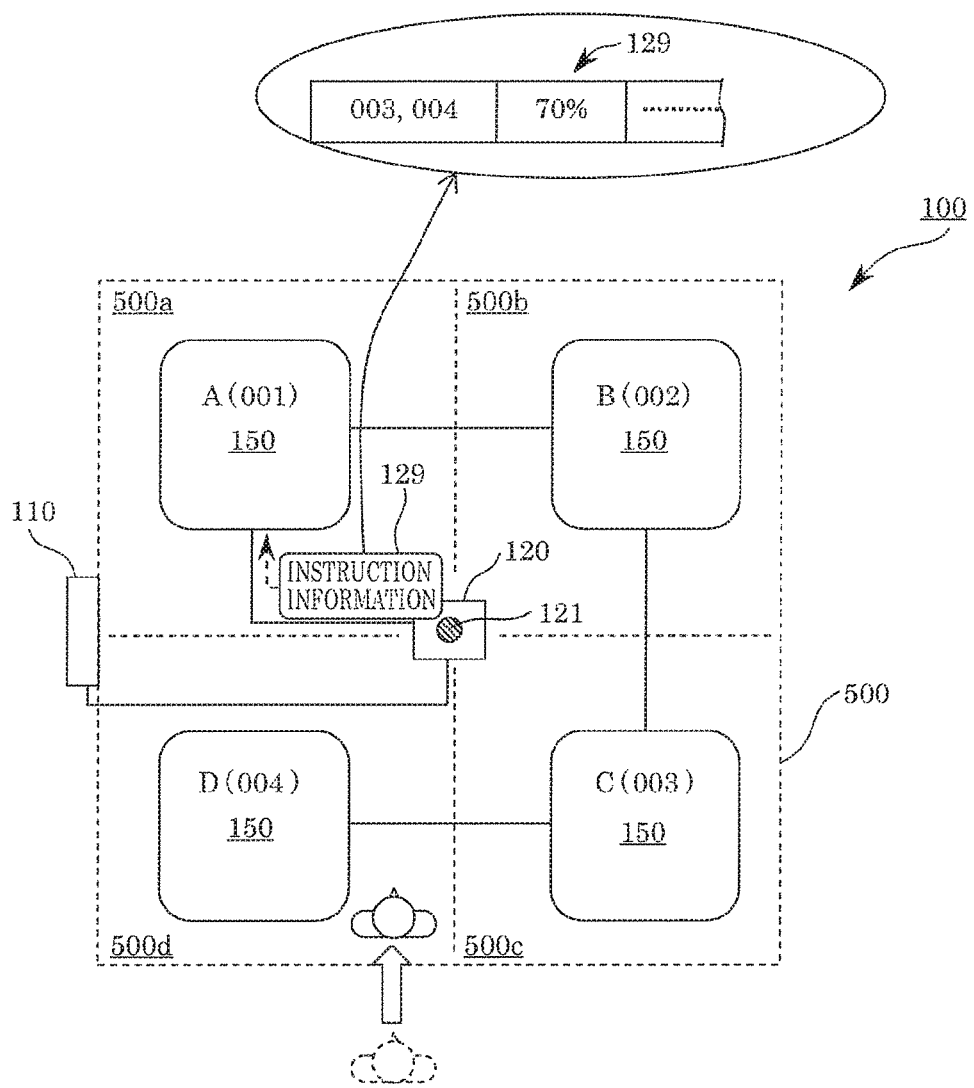
FIG. 15 illustrates a flow of instruction information in a lighting system according to Variation 5 of the embodiment.

FIG. 15 illustrates a flow of instruction information 129 in lighting system 100 according to Variation 5 of the embodiment.

Lighting system 100 according to this variation includes plural lighting devices 150 (A to D) each having an assigned address. In this variation, different addresses (001 to 004) are assigned to plural lighting devices 150 (A to D).

Dimming controller 124 of lighting control device 120 transmits, to plural lighting devices 150, instruction information 129 which includes at least one address among the addresses and information indicating a dimming level. In this manner, dimming of at least one lighting device 150 having the at least one address is controlled.

Specifically, lighting circuit 152 of each of plural lighting devices 150 receives instruction information 129 transmitted from lighting control device 120, and when the at least one address indicated in instruction information 129 includes the same address of lighting device 150 among plural lighting devices 150, lighting circuit 152 of lighting device 150 causes light source 155 of lighting device 150 to provide illumination at the dimming level indicated by instruction information 129.

In the example illustrated in FIG. 15, instruction information 129 includes two destination addresses "003" and "004", and "70%" indicating a dimming level.

In this case, four lighting devices 150 receive instruction information 129 transmitted from lighting control device 120. However, lighting device 150 (lighting device A) to which address "001" is assigned and lighting device 150 (lighting device B) to which address "002" is assigned ignore the instruction indicated in instruction information 129, because the destination addresses do not include the addresses of lighting devices A and B.

Lighting device 150 (lighting device C) to which address "003" is assigned and lighting device 150 (lighting device D) to which address "004" is assigned execute the instruction indicated in instruction information 129, because the destination addresses include the addresses of lighting devices C and D.

As a result, for example, the dimming level of lighting devices A and B is not changed, while the dimming level of lighting devices C and D is changed to "70%."

In this manner, lighting control device 120 can control dimming of lighting devices 150 differently.

This feature is useful in scenes as follows, for example. Now, assume the case where a person enters illumination region 500 in which no person was present, as illustrated in FIG. 15, during a period when lighting control device 120 is executing the human detection mode.

In the assumed case, illumination region 500 is divided into four subregions (500a to 500d) as illustrated in FIG. 15, and sensor device 121 detects a person in and brightness of each of the subregions (500a to 500d).

Subregions 500d and 500c are next to each other along the corridor contiguous to illumination region 500, and subregions 500a and 500b are both on the window side.

In this state, four lighting devices 150 provide illumination at a dimming level of "5%" before a person enters illumination region 500. Later, sensor device 121 detects the presence of the person in subregion 500d. Dimming controller 124 causes second communicator 125 to transmit instruction information 129 for changing the dimming level of lighting devices C and D which illuminate subregions 500d and 500c to "70%", based on the detection result.

In other words, instruction information 129 illustrated in FIG. 15, whose destination addresses are lighting devices C and D, is transmitted to four lighting devices 150, and only lighting devices C and D, among four lighting devices 150, cause light sources 155 to provide illumination at a dimming level of "70%", in accordance with instruction information 129.

As a result, a predetermined area of illumination region 500 which includes a position where the person is present is brightly illuminated, and the dimming level of one or more lighting devices 150 in other areas is maintained low. This achieves a partial increase in the brightness of illumination region 500 if necessary, and furthermore saves power consumption of entire lighting system 100.

Note that in the example illustrated in FIG. 15, dimming may be controlled to change the dimming level of only lighting device D in subregion 500d where the person is detected to "70%", among four subregions (500a to 500d).

Furthermore, different addresses are not necessarily assigned to lighting devices A to D. For example, the same address may be assigned to two or more lighting devices 150 for which dimming control for the same mode needs to be performed in synchronization.

For example, in the brightness detection mode, dimming controller 124 can also give an instruction indicating different dimming levels to four lighting devices 150, based on the detection results of brightness of four subregions (500a to 500d) obtained by sensor device 121. In this manner, for example, the brightness of the subregions can be equalized although the subregions are under different conditions such as how much natural light comes in.

Other Embodiments

Although the above has described lighting devices based on an embodiment and variations thereof, the lighting devices are not limited to the embodiment and the variations.

For example, if schedule information 200 indicates when to switch between modes in units of time, the time indicated by a counter value output from timer 111 may indicate at least hour of the time including hour, minute, and second.

Furthermore, schedule information 200 does not need to include parameters as illustrated in FIG. 4, for example. Assume an example of the case where lighting control device 120 stores parameters such as dimming levels or target illuminance for when a person is detected and for when no person is detected. In this case, if lighting control device 120 receives information for identifying a mode to be executed from system control device 110, lighting control device 120 can execute the mode using one or more parameters suitable for the mode.

In the human detection mode, a dimming level may be changed to three levels or more, for example. For example, if many people are detected, control for increasing the dimming level may be performed. Furthermore, if sensor device 121 detects a person in the human detection mode, sensor device 121 may output a detection result which indicates the state of the detected person. For example, if sensor device 121 detects a person, sensor device 121 may output a detection result that is more specifically classified, such as a detection result indicating that the detected person is not moving or is moving.

In this case, dimming controller 124 may control dimming using different dimming levels when the detection result output from sensor device 121 indicates that the detected person is moving and that the detected person is not moving. Further, system control device 110 may transmit such dimming levels to lighting control device 120.

In other words, if the instruction identified from schedule information 200 shows the human detection mode, instruction controller 114 of system control device 110 may cause first communicator 115 to transmit control information 119 which includes a parameter indicating a dimming level based on a state of a person when he/she is detected or a dimming level for when no person is detected.

Separate storage devices may store schedule information 200 and other information, such as parameter information 210 and time-of-day information 212.

A parameter such as a dimming level for each mode and a time of day assigned to each mode may be both arbitrarily determined in a schedule of dimming control which is to be executed by lighting control device 120. In other words, lighting system 100 may have features of both Variations 1 and 2.

Furthermore, an instruction given from system control device 110 and directed to lighting control device 120 may not explicitly show a mode to be executed by lighting control device 120. For example, if control information 119 includes information indicating that a target value is "500 lx", lighting control device 120 can determine that the brightness detection mode is to be executed. Similarly, if control information 119 includes information indicating two dimming levels, lighting control device 120 can determine that the human detection mode is to be executed. Furthermore, if control information 119 includes only one dimming level, lighting control device 120 can determine that the dimming level fixed mode is to be executed.

Light source 155 included in lighting device 150 may not include one or more LEDs. For example, one or more fluorescence tubes may be employed as light source 155. Furthermore, light emitting elements, such as semiconductor light emitting elements including a semiconductor laser, organic electroluminescence (EL), and inorganic EL, may be employed as light source 155.

Further, the present disclosure can be achieved as a program for causing a computer to execute distinctive processing that is performed by at least one of system control device 110 and lighting control device 120. Such a program can be distributed via a recording medium such as CD-ROM and a transmission medium such as the Internet.

The present disclosure may also include embodiments as a result of adding, to the embodiments, various modifications that may be conceived by those skilled in the art, and embodiments obtained by combining constituent elements and functions in the embodiments in any manner without departing from the spirit of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting system comprising:
a lighting device which includes a light source and a lighting circuit which causes the light source to provide illumination;
a lighting controller which controls dimming of the lighting device by controlling the lighting circuit; and
a system controller which controls the lighting controller,
the system controller including:
    a timer which outputs a counter value indicating a time;
    a schedule storage for storing schedule information which includes an instruction directed to the lighting controller and a time associated with the instruction;
    a first communication circuit which transmits information to the lighting controller; and
    an instruction controller which identifies, from the schedule information, an instruction associated with the time indicated by the counter value, and causes the first communication circuit to transmit control information which includes the identified instruction,
the lighting controller including:
    a sensor which detects a person in a space where the lighting device is disposed, and brightness of the space;
    a second communication circuit which receives the control information transmitted from the system controller; and
a dimming controller which switches to one of modes that is indicated in the control information from another of the modes and executes the one of the modes, the modes including (a) a human detection mode for controlling the dimming in accordance with a result of human detection by the sensor, (b) a brightness detection mode for controlling the dimming in accordance with a result of detection of the brightness by the sensor, and (c) a dimming level fixed mode for controlling the dimming by maintaining a dimming level at a fixed value,
wherein the schedule information includes an instruction to switch from one of the modes including the human detection mode, the brightness detection mode, and the dimming level fixed mode to another of the modes and a time to give the instruction, the time being associated with the instruction,
according to the control information, the dimming controller switches from one of the human detection mode and the brightness detection mode to the other, switches from one of the brightness detection mode and the dimming level fixed mode to the other, and switches from one of the dimming level fixed mode and the human detection mode to the other,
when the identified instruction indicates the human detection mode, the instruction controller causes the first communication circuit to transmit the control information which includes a parameter indicating one of a dimming level based on a state of a person when the person is detected and a dimming level for a case when no person is detected,
when the control information indicates the human detection mode, the dimming controller controls the dimming using the dimming level indicated by the parameter, and
the dimming controller controls the dimming using different dimming levels between a case when the result of human detection output from the sensor indicates that the detected person is moving and a case when the result of human detection output from the sensor indicates that the detected person is not moving.

2. The lighting system according to claim 1, wherein:
when the identified instruction indicates the brightness detection mode, the instruction controller causes the first communication circuit to transmit the control information which includes a parameter indicating a target value representing target brightness, and
when the control information indicates the brightness detection mode, the dimming controller controls the dimming to make the brightness which is detected by the sensor approximate to the target value indicated by the parameter.

3. The lighting system according to claim 1, wherein:
the counter value output by the timer indicates at least month and day of a date, in addition to the time,
the schedule storage further stores parameter information indicating a plurality of the parameters associated with periods, and
the instruction controller reads, from among the plurality of parameters indicated by the parameter information, a parameter associated with a period which includes at least one of the month and the day indicated by the counter value, and causes the first communication circuit to transmit the control information which includes the read parameter.

4. The lighting system according to claim 1, wherein:
the schedule information further includes an identifier tied with the time and associated with the instruction directed to the lighting controller,
the counter value output by the timer indicates at least month and day of a date, in addition to the time,
the schedule storage further stores time-of-day information indicating times of day associated with periods and identifiers including the identifier, and
the instruction controller reads, from among the identifiers in the time-of-day information, an identifier corresponding to (i) a period which includes at least one of the month and the day indicated by the counter value and (ii) the time indicated by the counter value, and identifies, from the schedule information, an instruction associated with the read identifier.

5. The lighting system according to claim 1, wherein:
plural lighting devices having assigned addresses, respectively, are provided,
the dimming controller transmits, to the lighting devices, instruction information which includes at least one address among the assigned addresses and information indicating a dimming level, to control the dimming of at least one lighting device having the at least one address, among the lighting devices,
the lighting circuit of each of the lighting devices receives the instruction information, and
when the at least one address indicated in the instruction information includes the address of a lighting device among the lighting devices, the lighting circuit of the lighting device causes the light source of the lighting device to provide illumination at the dimming level indicated in the instruction information.

6. A lighting system comprising:
a lighting device which includes a light source and a lighting circuit which causes the light source to provide illumination;
a lighting controller which controls dimming of the lighting device by controlling the lighting circuit; and
a system controller which controls the lighting controller,
the system controller including:
a timer which outputs a counter value indicating a time;
a schedule storage for storing schedule information which includes an instruction directed to the lighting controller and a time associated with the instruction;
a first communication circuit which transmits information to the lighting controller; and
an instruction controller which identifies, from the schedule information, an instruction associated with the time indicated by the counter value, and causes the first communication circuit to transmit control information which includes the identified instruction,
the lighting controller including:
a sensor which detects a person in a space where the lighting device is disposed, and brightness of the space;
a second communication circuit which receives the control information transmitted from the system controller; and
a dimming controller which switches to one of modes that is indicated in the control information from another of the modes and executes the one of the modes, the modes including (a) a human detection mode for controlling the dimming in accordance with a result of human detection by the sensor, (b) a brightness detection mode for controlling the dimming in accordance with a result of detection of the brightness by the sensor, and (c) a dimming level fixed mode for controlling the dimming by maintaining a dimming level at a fixed value, wherein:
the first communication circuit further receives setting information for controlling operation of the lighting device, which is transmitted from a communication terminal, and
the instruction controller further generates or updates the schedule information, using the setting information received by the first communication circuit, and causes the schedule storage to store the generated or updated schedule information,
wherein the schedule information includes an instruction to switch from one of the modes including the human detection mode, the brightness detection mode, and the dimming level fixed mode to another of the modes and a time to give the instruction, the time being associated with the instruction,
according to the control information, the dimming controller switches from one of the human detection mode and the brightness detection mode to the other, switches from one of the brightness detection mode and the dimming level fixed mode to the other, and switches from one of the dimming level fixed mode and the human detection mode to the other,
when the identified instruction indicates the human detection mode, the instruction controller causes the first communication circuit to transmit the control information which includes a parameter indicating one of a dimming level based on a state of a person when the person is detected and a dimming level for a case when no person is detected,
when the control information indicates the human detection mode, the dimming controller controls the dimming using the dimming level indicated by the parameter, and
the dimming controller controls the dimming using different dimming levels between a case when the result of human detection output from the sensor indicates that the detected person is moving and a case when the result of human detection output from the sensor indicates that the detected person is not moving.

7. The lighting system according to claim 6, wherein
the first communication circuit further transmits at least a part of the schedule information stored in the schedule storage to the communication terminal.

8. The lighting system according to claim 6, wherein
at least one communication circuit among the first communication circuit and the second communication circuit transmits, to the communication terminal which communicates with the at least one communication circuit, mode information indicating which mode among the human detection mode, the brightness detection mode, and the dimming level fixed mode the dimming controller is executing.

9. A method for controlling a lighting system which includes: a lighting controller which controls dimming of a lighting device; and a system controller which controls the lighting controller, the system controller including: a timer which outputs a counter value indicating a time; and a schedule storage for storing schedule information which includes an instruction directed to the lighting controller and a time associated with the instruction, the lighting controller including a sensor which detects a person in a space where the lighting device is disposed, and brightness of the space, the method comprising:

identifying, by the system controller from the schedule information, an instruction associated with the time indicated by the counter value;

transmitting, by the system controller, control information which includes the identified instruction to the lighting controller;

receiving, by the lighting controller, the control information transmitted from the system controller; and switching, by the lighting controller, to one of modes that is indicated in the control information from another of the modes, and executing, by the lighting controller, the one of the modes, the modes including (a) a human detection mode for controlling the dimming in accordance with a result of human detection by the sensor, (b) a brightness detection mode for controlling the dimming in accordance with a result of detection of the brightness by the sensor, and (c) a dimming level fixed mode for controlling the dimming by maintaining a dimming level at a fixed value, wherein the schedule information includes an instruction to switch from one of the modes including the human detection mode, the brightness detection mode, and the dimming level fixed mode to another of the modes and a time to give the instruction, the time being associated with the instruction, according to the control information, the lighting controller switches from one of the human detection mode and the brightness detection mode to the other, switches from one of the brightness detection mode and the dimming level fixed mode to the other, and switches from one of the dimming level fixed mode and the human detection mode to the other, when the identified instruction indicates the human detection mode, the control information, which includes a parameter, is transmitted, the parameter indicating one of a dimming level based on a state of a person when the person is detected and a dimming level for a case when no person is detected, when the control information indicates the human detection mode, the dimming is controlled, by the lighting controller, using the dimming level indicated by the parameter, and the dimming is controlled, by the lighting controller, using different dimming levels between a case when the result of human detection output from the sensor indicates that the detected person is moving and a case when the result of human detection output from the sensor indicates that the detected person is not moving.

* * * * *